United States Patent
Oh

(10) Patent No.: US 6,751,483 B1
(45) Date of Patent: Jun. 15, 2004

(54) METHOD OF DISPLAYING A LOCAL TIME OF A CALLED PARTY IN A PORTABLE MOBILE TERMINAL

(75) Inventor: Hae-Seok Oh, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/488,652

(22) Filed: Jan. 20, 2000

(30) Foreign Application Priority Data

Jan. 20, 1999 (KR) .......................................... 1999-1678

(51) Int. Cl.[7] ................................................ H04B 1/38
(52) U.S. Cl. ...................................... 455/566; 455/564
(58) Field of Search ............................ 455/566, 414.1, 455/415, 456.1, 457, 456.6, 564

(56) References Cited

U.S. PATENT DOCUMENTS

| | | | | | |
|---|---|---|---|---|---|
| 5,216,709 A | * | 6/1993 | Wen et al. | ................... | 379/354 |
| 5,528,558 A | * | 6/1996 | Mardhekar et al. | ........... | 368/10 |
| 5,818,920 A | * | 10/1998 | Rignell et al. | ............... | 455/445 |
| 6,075,992 A | * | 6/2000 | Moon et al. | ................. | 455/455 |
| 6,223,058 B1 | * | 4/2001 | Sudo et al. | ................. | 455/564 |

FOREIGN PATENT DOCUMENTS

| | | | | |
|---|---|---|---|---|
| EP | 0 516 124 | * | 12/1992 | .......... H04M/1/274 |
| GB | 2 284 965 | * | 6/1995 | ............ H04M/3/32 |

* cited by examiner

*Primary Examiner*—Charles Appiah
*Assistant Examiner*—Rafael Perez-Gutierrez
(74) *Attorney, Agent, or Firm*—Dilworth & Barrese, LLP

(57) ABSTRACT

A method of displaying the local time of a called party for a portable mobile terminal includes the steps of determining whether a country code and an area code is in an inputted phone number in accordance with an input of the phone number and an input of a call request key by a user, displaying on a display section of the mobile terminal the local time and a country name corresponding to the country code and the area code, if the country code and the area code are in the phone number, and transmitting a call for the inputted phone number when the call request key is input a second time by the user.

2 Claims, 5 Drawing Sheets

| COUNTRY CODE | AREA CODE | TIME DIFFERENCE | COUNTRY NAME |
|---|---|---|---|
|  |  |  |  |
FIG.3
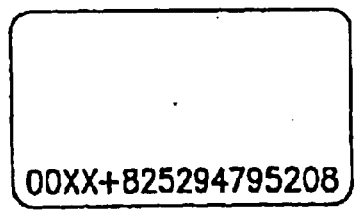
FIG.4A
(PRIOR ART)
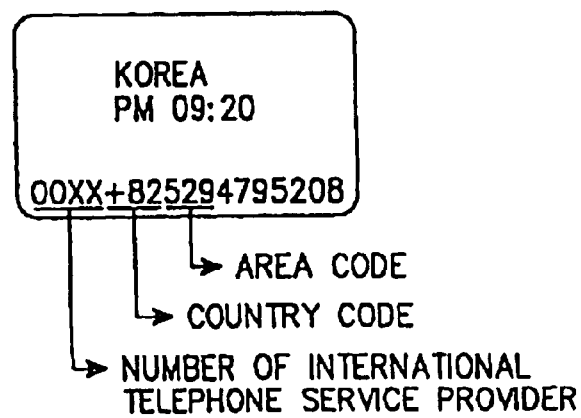
FIG.4B

METHOD OF DISPLAYING A LOCAL TIME OF A CALLED PARTY IN A PORTABLE MOBILE TERMINAL

BACKGROUND OF THE INVENTION

1. Field of the Invention

The present invention relates to a portable mobile terminal, and more particularly to a method of displaying a local time of a called party for a portable mobile terminal.

2. Description of the Related Art

Recently, due to the increased popularity of portable mobile terminals, more users are enjoying the convenience of mobile calling. However, the typical ringing sound of a portable mobile terminal when receiving a call may irritate a called party if the call is received at an inconvenient time of day. Functions have been added to portable mobile terminals in an attempt to reduce the possibility of annoyance. A function of this type is referred to as a "calling manner function" and allows a user to select a mode of call notification. The user selects between a ring mode and a vibration mode in the portable mobile terminal. However, this requires a called party to switch modes regularly to avoid receiving a ring tone at an inconvenient time of day.

A typical scenario would involve calling a party in a foreign country in which it is late in the evening. A calling party may thereby unknowingly irritate a called party by calling at an inconvenient time, while relating the call time to the current time in the calling party's location.

Therefore, a need exists for a portable mobile terminal that can display the local time of a called party in a foreign country when the user calls the party using the portable mobile terminal, thereby allowing a user to avoid calling the party at an inconvenient time of the day.

SUMMARY OF THE INVENTION

Accordingly, it is an object of the present invention to provide a method of displaying a local time of a called party in a portable mobile terminal.

It is another object of the present invention to provide a method of displaying a local time of a called party in a foreign country, before connecting the call, which enables a user to recognize that local time and decide whether or not to place the call at that time.

In order to achieve the above objects, a method of displaying a local time of a called party for a portable mobile terminal includes the steps of determining whether a country code and an area code is in an inputted phone number when a call request key is input by a user; displaying on a display of the mobile terminal the local time and a country name corresponding to the country code and the area code when the country code and the area code are in the phone number; and transmitting a call for the inputted phone number when the user inputs the call request key a second time.

BRIEF DESCRIPTION OF THE DRAWINGS

The foregoing and other objects, features and advantages of the present invention will become more apparent from the following detailed description when taken in conjunction with the accompanying drawings in which:

FIG. 3 is a view illustrating a table which stores time differences and country names corresponding to country codes and area codes according to an embodiment of the present invention;

FIG. 4A is a view illustrating the display state of a phone number inputted by a user on a display of a portable mobile terminal according to the prior art;

FIG. 4B is a view illustrating the display state of a country name and a local time of a called party, and a phone number inputted by a user on a display of a portable mobile terminal according to an embodiment of the present invention;

DETAILED DESCRIPTION OF THE PREFERRED EMBODIMENTS

Figure 1:
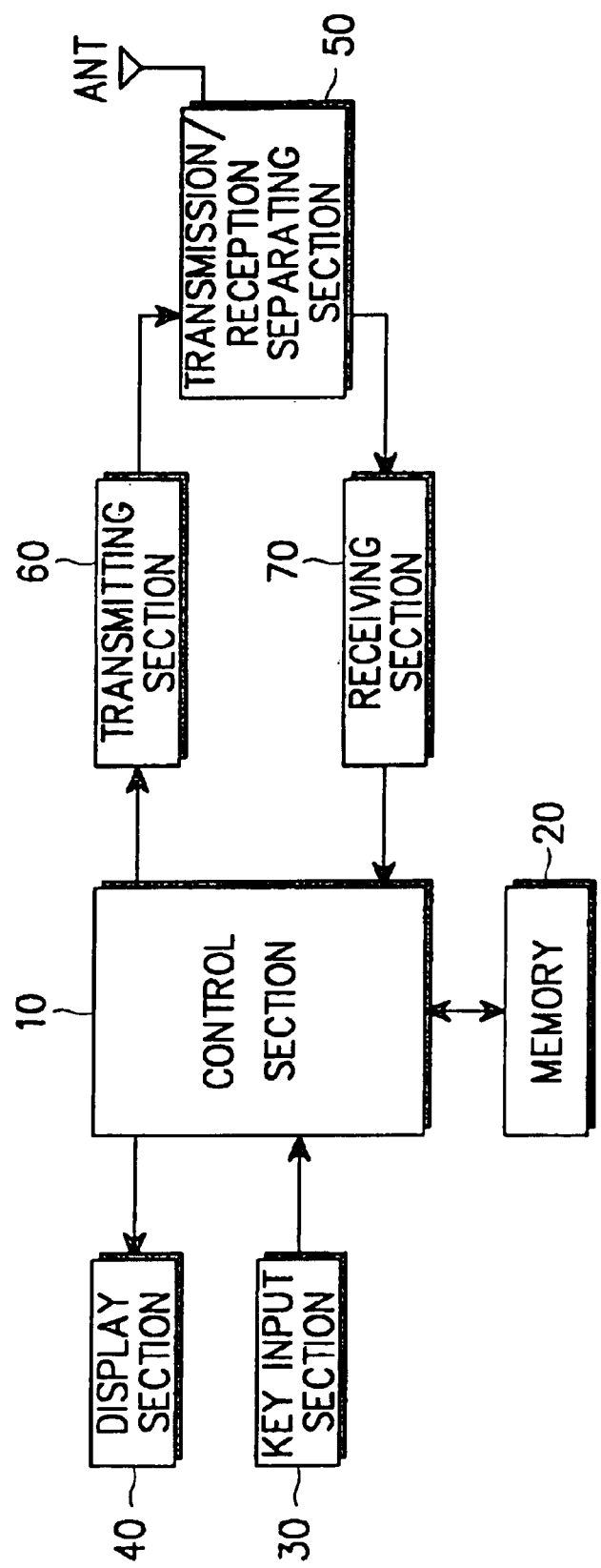
FIG. 1 is a block diagram of a portable mobile terminal to which an embodiment of the present invention is applied.

Reference will now be made in greater detail to the preferred embodiments of the present invention. In the accompanying drawings, the same or similar elements are denoted by the same reference numerals throughout the various figures. Additionally, a detailed description of known functions and configurations incorporated herein will be omitted to avoid obscuring the invention with unnecessary detail.

FIG. 1 is a block diagram of a portable mobile terminal to which the present invention is applied. Referring to FIG. 1, a control section 10 controls the whole operation of the mobile terminal. A memory 20 includes a read only memory (ROM) for storing a desired operating program, a random access memory (RAM) for temporarily storing data produced during the execution of the operating program, and an electrically erasable and programmable ROM (EEPROM). A key input section 30 includes a plurality of numeral keys, a power (PWR) key, a storage (STO) key, a send key, an end key, and function (FCN) keys for setting various functions, and outputs key data to the control section 10 according to a key input by a user. A display section 40 receives and displays the key data inputted from the key input section 30 through the control section 10 while displaying an operating state of the portable mobile terminal and other information using icons and alpha numeric characters. A transmission/reception separating section 50 separates radio signals being transmitted and received through an antenna ANT. A transmitting section 60 modulates data outputted from the control section 10 under the control of the control section 10, and transmits the modulated data which is carried as a radio frequency through the transmission/reception separating section 50 and the antenna ANT. A receiving section 70 receives through the transmission/reception separating section 50 a radio signal received through the antenna ANT, converts the radio signal to an intermediate frequency (IF) signal, and then demodulates the IF signal to data to output the demodulated data to the control section 10. In FIG. 1, the construction relating to a microphone and speaker is purposely omitted.

In the embodiment of the present invention, the EEPROM in the memory 20 has a table which stores the time differences and country names corresponding to the country codes and area codes as shown in FIG. 3. The EEPROM in the memory 20 also stores a phone number of an international telephone service provider in the country to which the user of the portable mobile terminal belongs.

Figure 2:
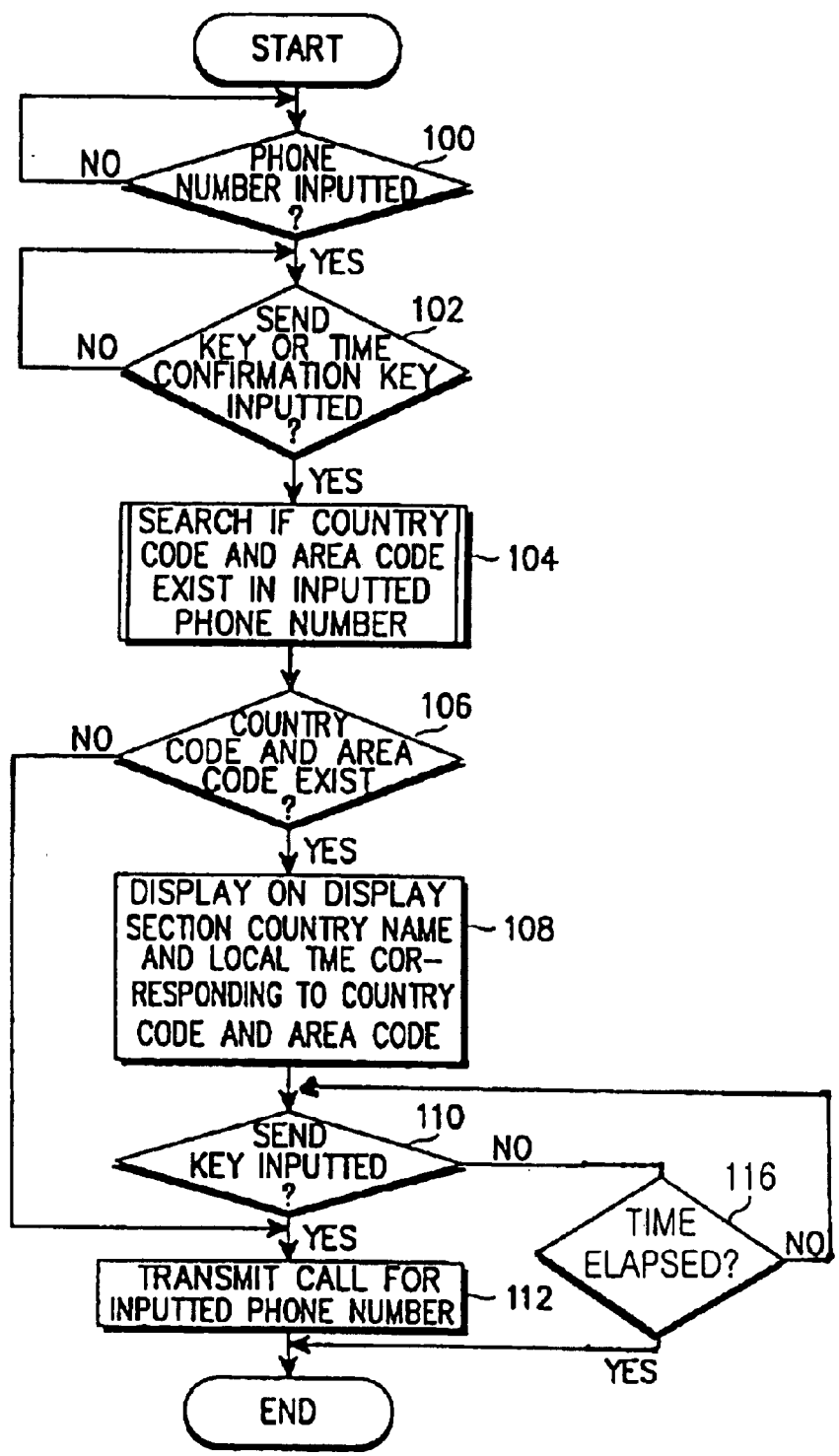
FIG. 2 is a control flowchart illustrating a display function of a local time of a called party in a portable mobile terminal according to an embodiment of the present invention.

FIG. 2 is a control flowchart illustrating a display function of a local time of a called party in a portable mobile terminal according to an embodiment of the present invention. The display method according to the present invention controls the portable mobile terminal to display the local time of the called party in the foreign country before calling the party. If the user inputs a phone number in step 100 and then hits a send key or a time confirmation key in step 102 using the key input section 30 of the portable mobile terminal, the control section 10 detects the key inputs and determines if the inputted phone number includes a country code and area code in step 104. The time confirmation key may be implemented by a combination of function keys or by adding a dedicated key.

In determining whether or not a country code and an area code exist in the inputted phone number according to the embodiment of the present invention, the following criteria is considered: (1) the total number of digits in the inputted phone number; (2) in a group special mobile or global system for mobile telecommunications (GSM) or a code division multiple access (CDMA) type system the first digit of the country code is considered; (3) the phone number of an international telephone service provider previously stored is used. For instance, in the United States, "011" is an available international access code. Examples of country codes are "82" for Korea, and "822" for Seoul, Korea after adding area code "2."

Figure 5:
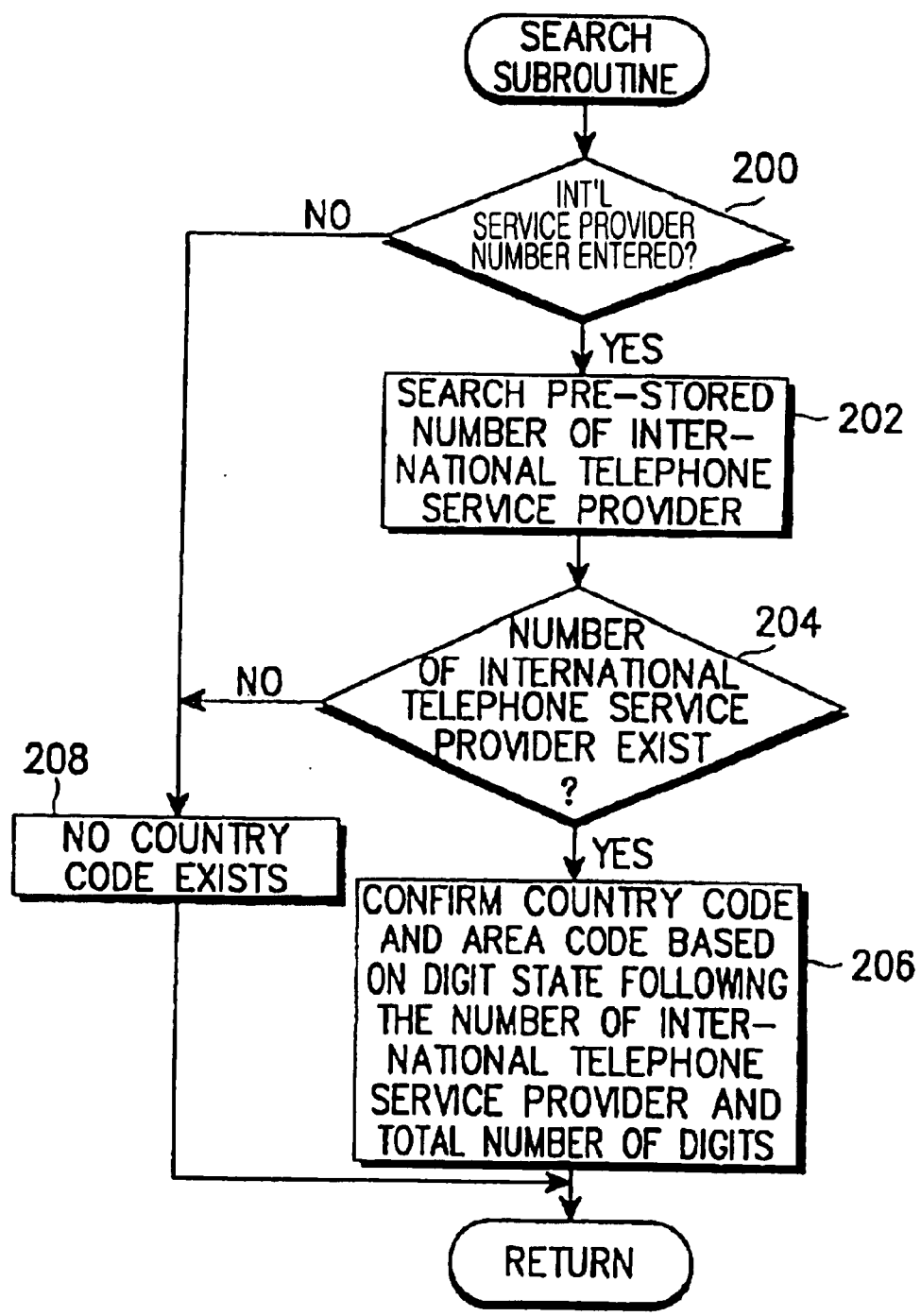
FIG. 5 is a control flowchart of a search subroutine for performing step 104 of FIG. 2.

FIG. 5 is a control flowchart of a search subroutine for performing step 104 of FIG. 2. Referring to FIG. 5, the control section 10 determines whether the first three digits of the inputted phone number are related to the international telephone service provider in step 200, and, if so, proceeds to step 202. At step 202, the control section 10 searches the number of the international telephone service provider pre-stored in the memory 20.

Thereafter, the control section 10 determines whether the number of the corresponding international telephone service provider exists in memory at step 204, and if so, it proceeds to step 206. At step 206, the control section 10 searches the country code and the area code based on the remaining digits following the international telephone service provider number and the total number of digits, searching the country code and the area code, as stated above in criteria (1) and (2).

Meanwhile, if it is determined that the first three digits of the inputted phone number are not related to the international telephone service provider in step 200, or the number of the corresponding international telephone service provider is not stored in the memory 20 at step 204, the control section 10 determines that no country code exists in the inputted phone number at step 208 of FIG. 5.

After searching to determine whether or not the country code and area code exist in the inputted phone number at step 104 of FIG. 2 by performing the subroutine of FIG. 5, the control section 10 determines, at step 106, whether or not the country code and area code exist.

If the country code and the area code exist, the control section 10 proceeds to step 108 of FIG. 2, obtaining the local time which corresponds to the country code and the area code using the table shown in FIG. 3, and displaying the local time on the display section 40. The local time of the called party which corresponds to the country code and the area code is calculated using the present time set in the portable mobile terminal, and the time difference in the country and area of the called party which corresponds to the country code and area code stored in the Table 3.

FIG. 4B is a view illustrating the display state of a country name and a local time of a called party, and a phone number inputted by a user on the display of the portable mobile terminal according to an embodiment of the present invention. Referring to FIG. 4B, a calling party in a country where the GSM type system is used inputs a phone number to make a phone call to Korea, for example. Referring to FIG. 4B, the country name "Korea" and the local time "PM 09:20" of the corresponding country and area are displayed on the display section of the portable mobile terminal under the control of the control section 10. FIG. 4A is a view illustrating the display state of a phone number inputted by a user on a display of a portable mobile terminal according to the prior art. Referring to FIG. 4A, the country name and the local time of the corresponding country and area are not displayed.

If the user still wants to make a call after viewing the local time of the called party on the display, the user presses the send key once again. In this case, the control section 10 detects this key input at step 110 of FIG. 2, and proceeds to step 112, where a call corresponding to the inputted phone number is transmitted. However, if the send key is not re-inputted at step 110 of FIG. 2 within a predetermined period of time as determined in step 116, the call corresponding to the inputted phone number is not transmitted, and the calling process is terminated.

Meanwhile, if it is determined that no country code and area code exists in the inputted phone number at step 106 of FIG. 2, the control section 10 transmits the call corresponding to the inputted phone number in step 112.

Figure 6:
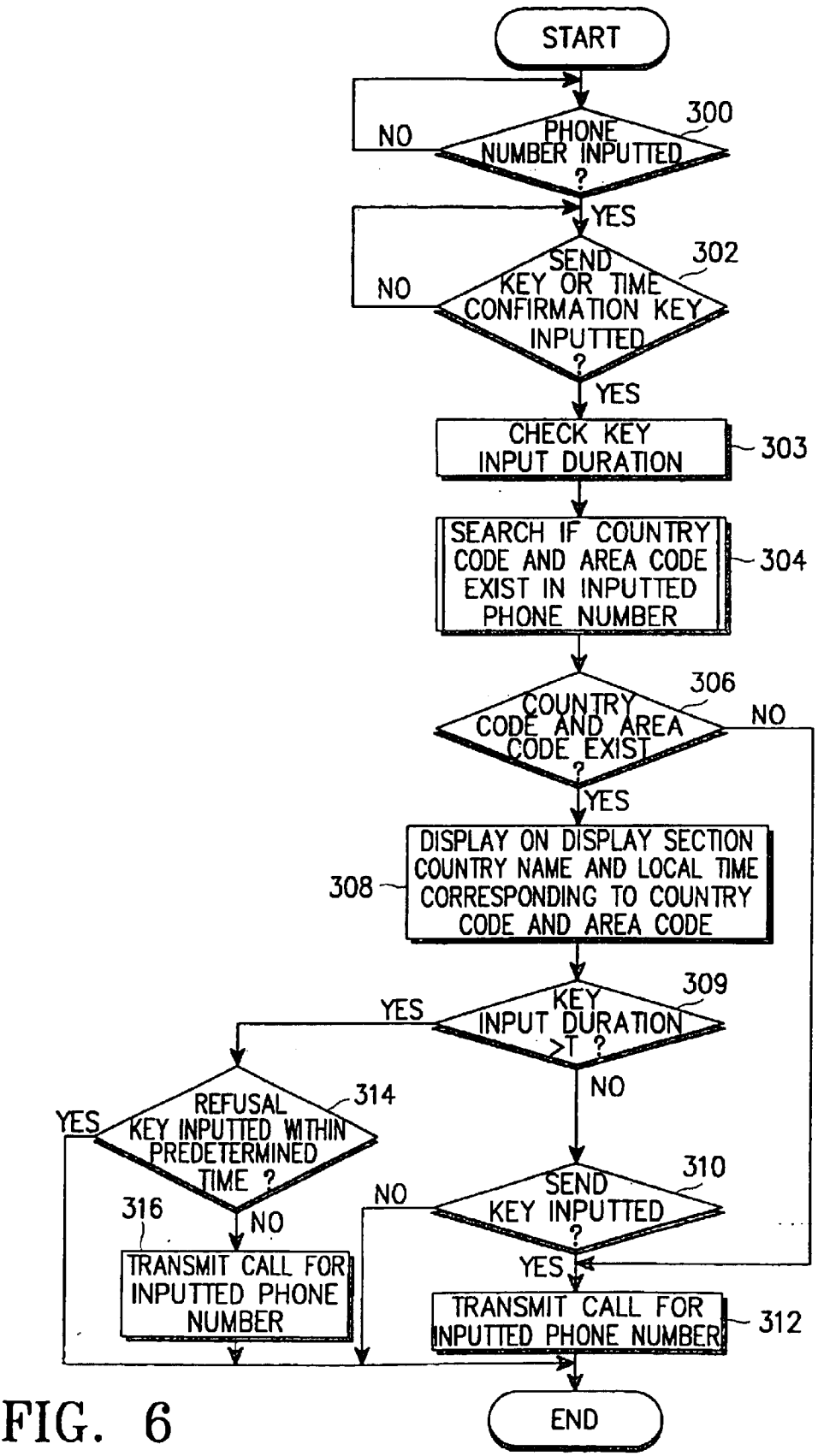
FIG. 6 is a control flowchart illustrating a display function of a local time of a called party in a portable mobile terminal according to another embodiment of the present invention.

FIG. 6 is a control flowchart illustrating a display function of a local time of a called party in a portable mobile terminal according to another embodiment of the present invention. Referring to FIG. 6, the control section 10 determines whether to automatically transmit the call corresponding to the inputted phone number based on a key input duration of the send key or the time confirmation key. Specifically, the method used in this embodiment allows transmitting the phone call without requiring any further key input if the key input duration is longer than a predetermined time period T (i.e., if the user presses the send key or the time confirmation key for a relatively extended period). After the user has already viewed the local time of the country or the area called.

In this case, if the user wants to cancel the call after viewing the local time of the called party displayed on the display section, the user presses a cancel key within a predetermined time. This method may be used as a call attempt method carried out with a passive call intercepting method at the same time.

The method used in this embodiment also allows for making a phone call similar to the previous embodiment by requiring an additional key input if the key input duration is shorter than the predetermined time period T (i.e., if the user presses the send key or the time confirmation key for a relatively short time) when the user makes a phone call after viewing the local time of the country or the area called.

In this case, if the user wants to make the call after viewing the local time of the country or the area being displayed on the display section, the user presses the send key once more within a predetermined time. This method may be used as a call attempt method carried with an active call intercepting method at the same time.

Referring to FIG. 6, if the user inputs the phone number and then inputs the send key or the time confirmation key using the key input section 30 of the portable mobile terminal, the control section 10 detects the key input at steps 300 and 302 of FIG. 6. If the phone number and the send key or the time confirmation key is inputted in sequence, the control section 10, in step 303, checks the key input duration of the key inputted in step 302. Then, the control section 10 determines whether the country code and the area code exist in the inputted phone number in step 304. This operation is the same as that described with reference to FIG. 5.

If the country code and the area code exist in the phone number inputted at step 304, the control section 10 obtains the country name which corresponds to the country code, and the local time which corresponds to the country code and the area code using the table as shown in FIG. 3, and displays the country name and the local time on the display section 40 in steps 306 and 308.

Thereafter, the control section 10 determines whether the key input duration checked at step 303 is longer than the predetermined time period T in step 309 (i.e., whether the time confirmation key is pressed for an extended time or for a short time). If the key input duration is shorter than the predetermined time period T, the control section 10 determines whether the send key is inputted by the user within a predetermined time in step 310. If the user presses the send key within the predetermined time, the control section 10 transmits the call corresponding to the inputted phone number in step 312. This process may be used as the call attempt method carried with the active call intercepting method at the same time.

If the key input duration is longer than the predetermined time period T as determined in step 309 (i.e., if the user presses the send key or the time confirmation key for an extended time), the control section 10 determines whether a refusal key is inputted by the user within a predetermined time in step 314. If the user presses the refusal key within the predetermined time, the control section 10 does not transmit the call corresponding to the inputted phone number. However, if the refusal key is not inputted within the predetermined time, the control section 10, in step 316, transmits the call corresponding to the inputted phone number without requiring re-input of the send key (step 316 of FIG. 6). This process may be used as the call attempt method carried with the passive call intercepting method at the same time.

As described above, according to the method of displaying a local time of a called party in a foreign country according to the present invention, the local time of the called party is displayed before connecting the call, and thus a user is alerted prior to placing a phone call at an inappropriate time and given an opportunity to abort the call accordingly.

While the present invention has been described in connection with the preferred embodiments, they represent mere exemplary applications. Thus, it is to be understood that the invention is not limited as such and that many variations can be made by anyone of ordinary skill in the art while staying within the spirit and scope of the present invention as defined by the appended claims.

What is claimed is:

1. A method of displaying a local time of a called party for a portable mobile terminal with a display section and a memory, said method comprising the steps of:

(a) inputting a phone number and a call request key;
    (b) determining if a country code and an area code is in an inputted phone number;
    (c) checking an input duration of the call request key;
    (d) displaying the local time and a country name corresponding to the country code and the area code on the display section when the country code and the area code are in the inputted phone number; and
    (e) selectively transmitting a call to the inputted phone number according to the input duration of the call request key, by transmitting the call to the inputted phone number after a predetermined time if the input duration of the call request key is longer than a predetermined time, and transmitting the call to the inputted phone number if the input duration of the call request key is shorter than the predetermined time and the call request key is input a second time after said step (d).

2. The method as claimed in claim 1, wherein said step (e) further comprises the step of intercepting transmission of the call for the inputted phone number if a key corresponding to a call cancel is inputted within a predetermined time by a user.

* * * * *